United States Patent
Abu Al-Rubb

(10) Patent No.: US 10,401,892 B2
(45) Date of Patent: Sep. 3, 2019

(54) VEHICLE CONTROL SYSTEM

(76) Inventor: Khalil Abu Al-Rubb, Doha (QA)

(*) Notice: Subject to any disclaimer, the term of this patent is extended or adjusted under 35 U.S.C. 154(b) by 23 days.

(21) Appl. No.: 13/636,025

(22) PCT Filed: Sep. 15, 2010

(86) PCT No.: PCT/GB2010/001736
§ 371 (c)(1),
(2), (4) Date: Oct. 5, 2012

(87) PCT Pub. No.: WO2011/114082
PCT Pub. Date: Sep. 22, 2011

(65) Prior Publication Data
US 2013/0074634 A1 Mar. 28, 2013

(30) Foreign Application Priority Data
Mar. 19, 2010 (GB) .................... 1004680.3

(51) Int. Cl.
| G05G 1/30 | (2008.04) |
| B60K 26/02 | (2006.01) |
| B60W 30/18 | (2012.01) |
| G05G 1/38 | (2008.04) |
| G05G 1/44 | (2008.04) |
| G05G 1/445 | (2008.04) |

(52) U.S. Cl.
CPC ............ G05G 1/305 (2013.01); B60K 26/02 (2013.01); B60W 30/18181 (2013.01); G05G 1/38 (2013.01); G05G 1/445 (2013.01); Y10T 74/20213 (2015.01)

(58) Field of Classification Search
CPC .. B60K 26/02; B60K 2026/029; G05G 1/305; G05G 1/445; G05G 1/38
USPC ..... 74/512–514, 560–562.5, 473.16, 473.17, 74/478, 478.5, 481–482, 480 R; 477/210, 477/211, 215
See application file for complete search history.

(56) References Cited

U.S. PATENT DOCUMENTS

| 1,233,525 | A | * | 7/1917 | Terry ............................. 74/513 |
| 1,480,421 | A | * | 1/1924 | Smith ............................ 74/564 |
| 1,527,151 | A | * | 2/1925 | Davis ............................ 477/215 |
| 1,630,760 | A | * | 5/1927 | Powell .......................... 477/215 |
| 1,923,173 | A | * | 8/1933 | Stewart et al. ................. 74/478 |

(Continued)

FOREIGN PATENT DOCUMENTS

| DE | 1834881 U | 7/1961 | |
| DE | 1948480 A1 | * 4/1971 | ............ B60W 10/04 |

(Continued)

OTHER PUBLICATIONS

EPO Translation of the Description of DE 4405111 A1, Stenke et al., Aug. 24, 1995.*

(Continued)

*Primary Examiner* — Daniel D Yabut
(74) *Attorney, Agent, or Firm* — Christopher & Weisberg, P.A.

(57) ABSTRACT

A pedal (2) for use with both feet wherein depression with one foot causes acceleration and depression by the other foot causes braking. The pedal pivots about a medial line of a user. A system to detect a change in the pivot direction of the pedal is also included, the system automatically switching between acceleration and braking in response to a detected change.

9 Claims, 8 Drawing Sheets

(56) References Cited

U.S. PATENT DOCUMENTS

| | | | |
|---|---|---|---|
| 2,090,152 A * | 8/1937 | Porter | 477/210 |
| 3,240,299 A * | 3/1966 | Buchwald | 74/560 |
| 3,386,541 A | 6/1968 | Luijt | |
| 3,580,370 A | 5/1971 | McCammon | |
| 4,106,362 A * | 8/1978 | Hildebrecht | 74/473.17 |
| 4,120,387 A | 10/1978 | Otteblad et al. | |
| 4,250,768 A * | 2/1981 | Hildebrecht | 74/512 |
| 4,802,381 A * | 2/1989 | Lo | 74/513 |
| 5,222,416 A * | 6/1993 | Shakhov | 74/512 |
| 5,263,385 A * | 11/1993 | Hirata et al. | 74/481 |
| 6,051,797 A * | 4/2000 | Meinel | H01H 21/26 200/86.5 |
| 6,357,232 B1 | 3/2002 | Strashny | |
| 6,561,303 B2 * | 5/2003 | Pierce et al. | 74/514 |
| 2010/0132501 A1* | 6/2010 | Owen | 74/514 |

FOREIGN PATENT DOCUMENTS

| | | | |
|---|---|---|---|
| DE | 2060450 A1 | | 6/1972 |
| DE | 2164541 A1 | * | 7/1973 |
| DE | 2615237 A1 | | 10/1977 |
| DE | 2716969 A1 | * | 10/1978 |
| DE | 4405111 A1 | | 8/1995 |
| DE | 19603648 A1 | | 8/1997 |
| DE | 10058753 A1 | | 9/2001 |
| DE | 10118436 A1 | | 10/2002 |
| EP | 0038367 A1 | | 10/1981 |
| EP | 1139195 A1 | * | 10/2001 |
| GB | 398637 | | 9/1933 |
| GB | 820725 | | 9/1959 |
| GB | 1051785 | | 12/1966 |
| JP | 57151149 U | | 9/1982 |
| JP | 62043345 | | 2/1987 |
| JP | 2000025587 A | | 1/2000 |
| JP | 2004352228 | | 12/2004 |
| WO | 2009059347 A1 | | 5/2009 |

OTHER PUBLICATIONS

EPO Translation of Description of DE 19603648 A1, Marner et al., Aug. 7, 1997.*
EPO Translation of Description of DE 2716969 A1, Schmidt, Oct. 19, 1978.*
EPO Translation of the Description of DE 10118436 A1, Babbel et al., Oct. 17, 2002.*
EPO Translation of the Description of DE 1948480 A1, Franzmann, Apr. 1, 1971.*
United Kingdom Patents Act 1977: Search Report under Section 17(5); Application No. GB1004680.3; dated Jul. 15, 2010; 4 pages.
PCT Written Opinion and International Search Report; International Application No. PCT/GB2010/001736; International Filing Date: Sep. 15, 2010; 10 pages.
Partial English Translation of Japanese Office Action for Japanese Serial No. 2012-557597, dated Feb. 18, 2014, consisting of 5-pages.
English Translation of Chinese First Office Action for Chinese Serial No. 201080065577.0 dated Mar. 5, 2014 and Chinese Language First Office Action consisting of 9 pages in total.
English Translation of Russian First Office Action for Russian Serial No. 2012144294-11(071128) dated Jun. 3, 2014 and Russian Language First Office Action consisting of 7 pages in total.
2nd Australian Examination Report dated Feb. 2, 2016 for corresponding Australian Application Serial No. 2010348751, consisting of 5 pages.
1st Australian Examination Report dated Jun. 15, 2015 for corresponding Australian Application Serial No. 2010348751, consisting of 3 pages.
1st European Examination Report dated Sep. 16, 2015 for corresponding European Application Serial No. 10757452.7-1751, consisting of 5 pages.
2nd European Examination Report dated Mar. 30, 2016 for corresponding European Application Serial No. 10757452.7-1751, consisting of 4 pages.
1st Indonesian Examination Report in both Indonesian and its English translation dated Feb. 15, 2016 for corresponding Indonesian Application Serial No. W-00201203881, consisting of 4 pages.

* cited by examiner

VEHICLE CONTROL SYSTEM

CROSS-REFERENCE TO RELATED APPLICATIONS

This application is a Submission Under 35 U.S.C. § 371 for U.S. National Stage Patent Application of International Application Number: PCT/GB2010/001736, filed Sep. 15, 2010 entitled "VEHICLE CONTROL SYSTEM," which claims priority to Great Britain Application Serial No. 1004680.3, filed Mar. 19, 2010, the entirety of both which are incorporated herein by reference.

This invention relates to a vehicle control system and, in particular, a pedal.

Pedals for manual transmission vehicles include accelerator, brake and clutch pedals; automatic transmission vehicles do not require a clutch pedal. The accelerator, also know as the gas pedal or the throttle, controls the fuel and/or air supply to the engine of the vehicle, which may be an automobile.

In some automobiles, an additional parking brake pedal is provided. This parking brake pedal is provided in place of a hand brake.

Pedals are commonly provided in either a standing or a hanging arrangement. Standing pedals protrude from the floor of the vehicle, while hanging pedals extend downwards into the foot well of the vehicle.

A space behind each pedal is required so that the driver of the vehicle is able to depress the pedal. The driver of the vehicle activates the pedal by pressing their foot against the pedal and moving it towards the front of the vehicle.

Therefore, in known vehicles, there is a space in, around, above and/or below the pedals. This space may pose a hazard to the operation of the vehicle. Objects may become wedged in or around the pedals, or parts of the interior of the vehicle may interfere with the proper and safe functioning of the pedals. Such objects include carpets or rugs in the foot well of the vehicle which entangle with the pedals. The carpet (or other object) may therefore inhibit the proper working of one or more pedals by a driver of the vehicle by either blocking access to the pedal, by jamming the mechanism of the pedal, or by restricting the range of movement of the pedal or by impeding a human reflex. This, in turn, may result in the driver losing control, or not being in full control, of the vehicle.

It is an object of the invention to reduce the hazard that vehicle pedals pose to those in and around a vehicle.

According to a first aspect, the invention provides a pedal for a vehicle comprising a control surface and a fulcrum so that the control surface pivots about the fulcrum, wherein pivoting of said control surface in a first direction being associated with a braking system of said vehicle and pivoting of said control surface in a second direction being associated with an acceleration system of said vehicle, so that pivoting of said control surface about said fulcrum causes either braking or acceleration of said vehicle, and wherein the pedal is adapted to be operated by two feet of a user, wherein a first foot is used to pivot the pedal in the first direction and a second foot is used to pivot the pedal in the second direction.

The pedal may further comprise a clutch pedal, wherein the clutch pedal is located in between the first control surface and the driver of the vehicle.

The clutch pedal may be located between the fulcrum and a location of the user.

The control surface may be concave with respect to the user.

The control surface may be orientated substantially vertically with respect to the orientation of the user.

According to a further aspect, the invention provides a vehicle control device operable by two feet of a driver of a vehicle, said control device being arranged in said vehicle so that pressure on a first side of the first control surface form a first foot of the driver issues an acceleration instruction to the vehicle, while pressure on a second side of the first control surface form a second foot of the driver issues a braking instruction to the vehicle, and wherein said control device is arranged so that it is not possible to issue the acceleration and braking instructions simultaneously.

According to a further aspect, the invention provides a pedal for a vehicle comprising a control surface and a fulcrum so that the control surface pivots about the fulcrum, wherein pivoting of said control surface in a first direction is associated with a braking system of said vehicle and pivoting of said control surface in a second direction is associated with an acceleration system of said vehicle, so that pivoting of said control surface about said fulcrum causes either braking or acceleration of said vehicle, and wherein the fulcrum is orientated substantially parallel to a medial line of a user of the pedal substantially perpendicular to a floor surface of the vehicle.

According to a further aspect, the invention provides a control system for a vehicle, the vehicle comprising an acceleration system and a braking system, the control system comprising a control surface mounted for pivoting movement about a fulcrum, said control surface being connected to said acceleration system and said braking system so that pivoting of said control surface in a first direction causes acceleration of said vehicle and pivoting in a second direction causes braking, said control system further comprising means for determining a change in the direction of pivoting of said control system, said control system being adapted to alternate between braking and acceleration or vice versa or detecting said change in the direction of pivoting of said control surface.

The means for detecting a change in direction of pivoting of said control surface may comprise means for detecting a distance between said control surface and a foot well of said vehicle.

The means for detecting a change in a direction of pivoting of said control surface may comprise a linear shaft encoder.

The means for detecting a change in a direction of pivoting of said control surface may comprise a rotary shaft encoder.

The vehicle may be an automobile.

The control surface of the pedal may be mounted by either a hanging or a standing connection. The control surface may be fixed in position within the foot well, or may be electronically or mechanically adjustable to alter the position thereof within the foot well.

The invention provides a pedal which is less likely to become jammed by, or entangled with, objects in the foot well of the vehicle such as mats. Furthermore where, for example, a carpet is at least partially covering the pedal of the invention, the pedal is still operable.

The pivoting of the pedal about a fulcrum provides a mechanism where either the first or second side or end of the control system may be depressed to generate a control signal. However, both sides or ends of the control surface cannot be depressed simultaneously to generate multiple control signals corresponding to both sides or ends of the control surface.

The pedal of the invention provides control of the vehicle such that it is impossible to attempt to accelerate and brake simultaneously. Therefore a safer and more reliable control of the vehicle is provided and unnecessary wear and tear of brake pads and brake discs is avoided By providing an area of the pedal of the invention comparable to the size of the foot well embodiments of the inventor reduce the chances that the driver will miss the desired end or side in an emergency.

Advantages of the invention, in addition to those of increased safety during operation of the vehicle, include providing better utilisation of the area behind the pedals. As the cavity behind the pedals in the foot well of a vehicle is decreased, it is then possible to utilise this space to either shorten the vehicle, or provide more storage in that or a different part of the vehicle.

One or more sensors may be used to identify a force provided by a driver which pivots the control surface about the fulcrum. The torsional force acting about the fulcrum or a rotation about the fulcrum may also be measured to translate the driver's actions into control of the vehicle.

Further, a hydraulic, pneumatic, electric or electronic system may be positioned behind at least one side of the control surface to transmit force applied by the driver against either side of the control surface to braking or acceleration systems of the vehicle.

The invention will now be described with reference to the drawings in which:—

Figure 1:
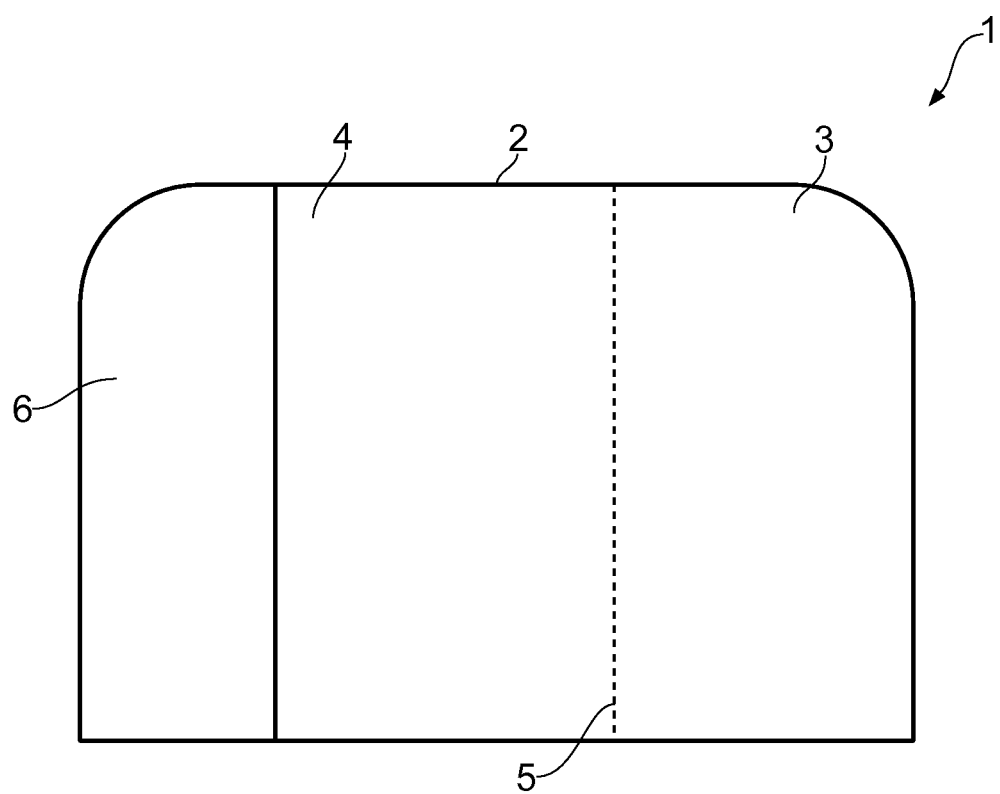
FIG. 1 is a front schematic view of a pedal in accordance with a first embodiment of the invention.

Referring to FIG. 1, the pedal 1 comprises a control surface 2 having a first side 3 and a second side 4. Adjacent to the first control surface 2 is a footrest 6. The first control surface 2 may move independently of the footrest 6. A fulcrum 5 is attached to the control surface 2 and partitions the control surface so that it has the first side 3 and the second side 4.

The control surface 2 pivots about the fulcrum 5 with the application of a force to either the first side 3 of the first control surface 2 or to the second side 4 of the first control surface 2.

Figure 2:
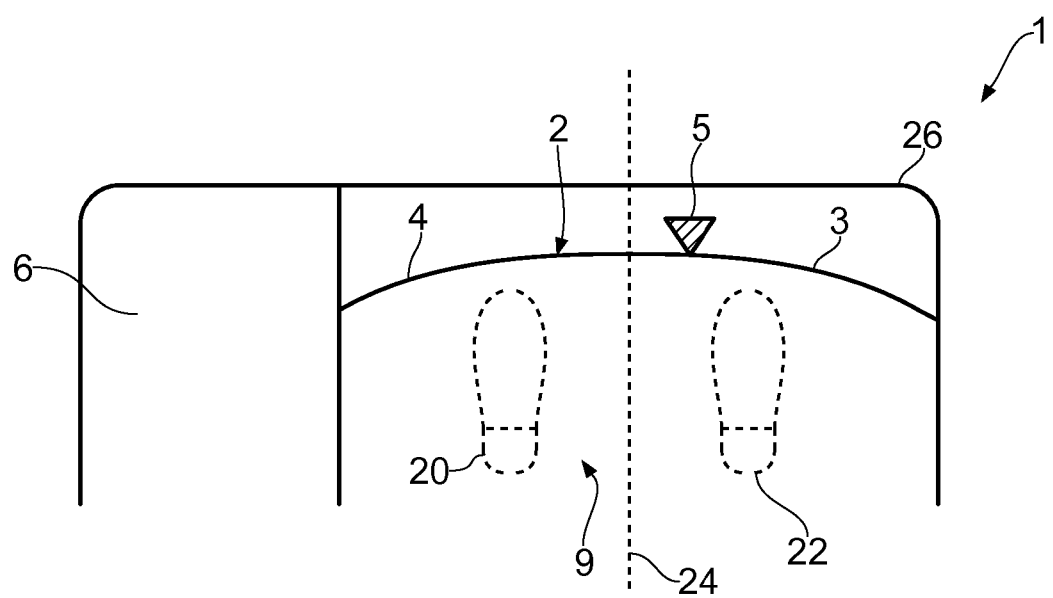
FIG. 2 is a plan schematic view of the pedal of FIG. 1.

Referring to FIG. 2, the pedal 1 is housed within a foot well 9 of an automobile. The fulcrum 5 is disposed behind the control surface 2. The positioning of the fulcrum in the embodiment shown provides a greater area for the second side 4 than the area of the first side 3. As illustrated in FIG. 2, the left foot 20 and right foot 22 (both illustrated in dashed outline) of a user are located within the foot well 9. Dashed line 24 represents a median line of the user with left foot 20 and right foot 22 disposed on either side of median line 24. The control surface 3 is orientated so that the left foot 20 operates the second side 4 and right foot 22 operates the first side 3. As the control surface 2 pivots about fulcrum 5, it will be appreciated that it is not possible for the user to depress both the first side 3 and the second side 4 simultaneously.

A force applied to either the first side 3 or second side 4 of the first control surface 2 will cause the first control surface 2 to pivot about the fulcrum 5.

The pivoting of the first control surface 2 about the fulcrum 5 provides an input for the acceleration and braking systems of the vehicle. In the embodiment illustrated, the input to the acceleration and breaking systems is provided by a mechanical linkage. In further embodiments a hydraulic, pneumatic or electronic linkage may be provided. The mechanical linkage functions similarly to a standing or hanging pedal in a known automobile, where the mechanical linkage connects the first control surface 2 to the acceleration system and the braking system of the automobile.

Where an electronic system is used, a sensor detects the position or movement of the first control surface 2. This information is then transmitted to an actuator which controls the acceleration and/or braking systems.

In further embodiments, a combination of the above types of control systems may be used. Multiple control systems may be used to provide increased reliability of the acceleration and braking systems.

Figure 3:
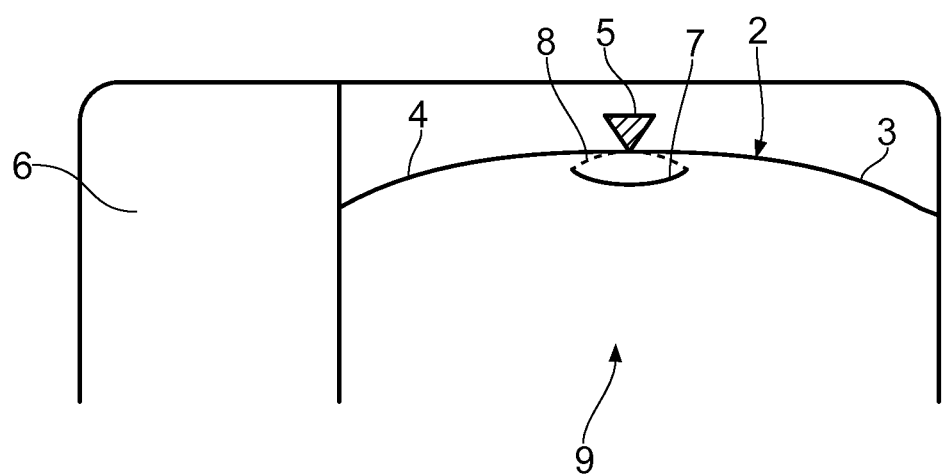
FIG. 3 is a plan schematic view of a pedal in accordance with a second embodiment of the invention.

FIG. 3 illustrates a plan view of a second embodiment of pedal 1 providing control surface 2 and clutch 7. The control surface 2 comprises a first side 3 and a second side 4.

The clutch pedal 7 is positioned in front of both the control surface 2 and the fulcrum 5. The clutch pedal 7 is connected to a clutch which is operated when the clutch pedal 7 is depressed.

In FIG. 3, the clutch pedal 7 is operated by a force provided by a driver. The depressed state 8 of the clutch pedal 7 is shown by a dashed line.

Figure 4:
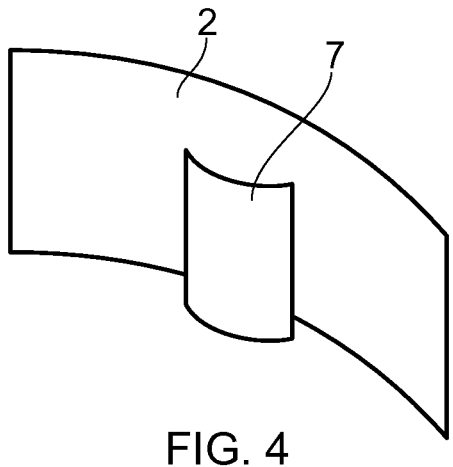
FIG. 4 is an isometric view of a pedal in accordance with a second embodiment of the invention.

FIG. 4 shows the control surface 2 and the clutch pedal 7. In this embodiment, the clutch pedal 7 does not extend the full height of the first control surface 2. However, in a further embodiment the clutch pedal 7 extends the full height of the first control surface 2.

Figure 5:
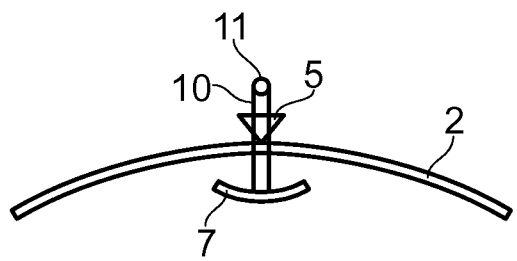
FIG. 5 is a plan schematic view of a pedal in accordance with a second embodiment of the invention.

FIG. 5 shows the control surface 2 and the associated fulcrum 5. Also shown is the clutch 7, a pivot point 11 and a rod 10 connecting the pivot point 11 to the clutch 7.

In this embodiment, the clutch pedal 7 is coupled to a pressure sensor, not shown. The pressure sensor is operable to detect when the driver of the vehicle depresses the clutch pedal 7. The signal from the pressure sensor is transmitted to an actuator which controls the clutch of the vehicle.

The pressure sensor is located between the clutch pedal 7 and the first control surface 2. To avoid force applied to the clutch pedal 7 causing rotation of the control surface 2, the clutch plate is mounted in front of the fulcrum 5. In a further embodiment, the control surface 2 includes a pressure sensor connected to an actuator of a clutch in place of a clutch pedal.

The pivot point 11 is coupled to the clutch 7 in such a way that any movement of the clutch 7 provides a force which causes movement of the pivot 11. The pivot point 11 is connected to a clutch of an automobile. The pivot point 11 is, in this embodiment, connected to the clutch 7 by a mechanical linkage. In further embodiments, this connection may be hydraulic, pneumatic or electronic.

In the embodiment of FIG. 5, the rod 10 passes through the first control surface 2 and above the fulcrum 5. The rod 10 contacts the rear of the first control surface 2. In certain embodiments, the fulcrum 5 does not run the entire vertical length of the first control surface 2.

Figure 6:
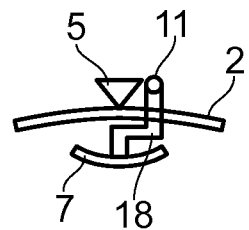
FIG. 6 is a plan schematic view of a part of the pedal in accordance with a third embodiment of the invention.

In FIG. 6, the rod 18 does not pass through the fulcrum 5. Instead, in this embodiment, the rod 18 passes through the first control surface 2 at a point to the right of the fulcrum 5 (as viewed in FIG. 6). The rod 18 comprises three sections.

Figure 7:
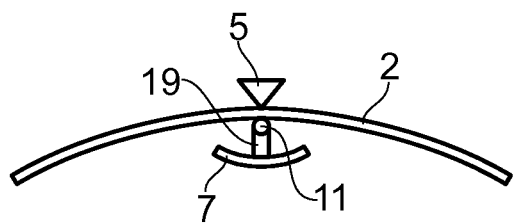
FIG. 7 is a plan schematic view of a pedal in accordance with a fourth embodiment of the invention.

In the embodiment of FIG. 7, the pivot point 11 is located in front of the first control surface 2 and the rod 19 does not pass through the first control surface 2. The rod 19 can therefore be made to a relatively short length and this will allow the pivot point 11 to be positioned at the rear surface of the clutch 7.

Figure 8:
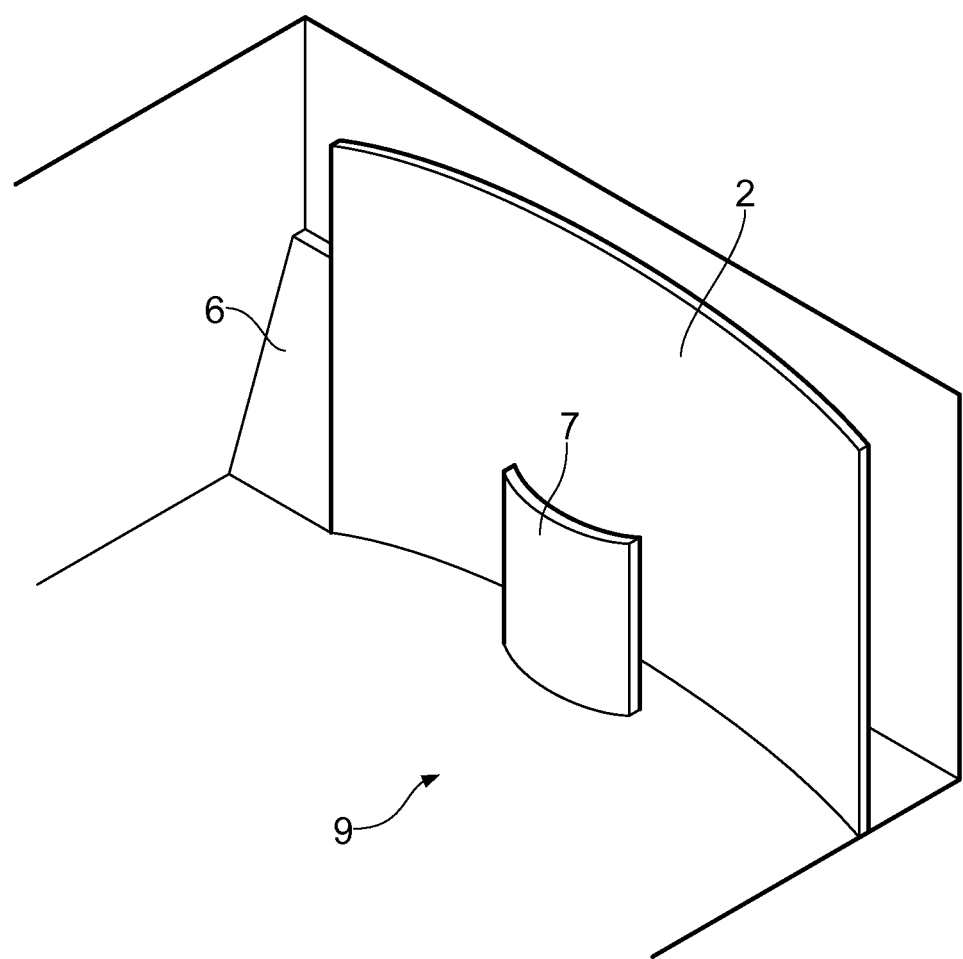
FIG. 8 is an isometric view of a pedal and a footrest in a foot well in accordance with a second embodiment of the invention.

FIG. 8 illustrates the first control surface 2, the clutch 7 and a footrest 6 positioned in the foot well 9 of a vehicle.

Figure 9:
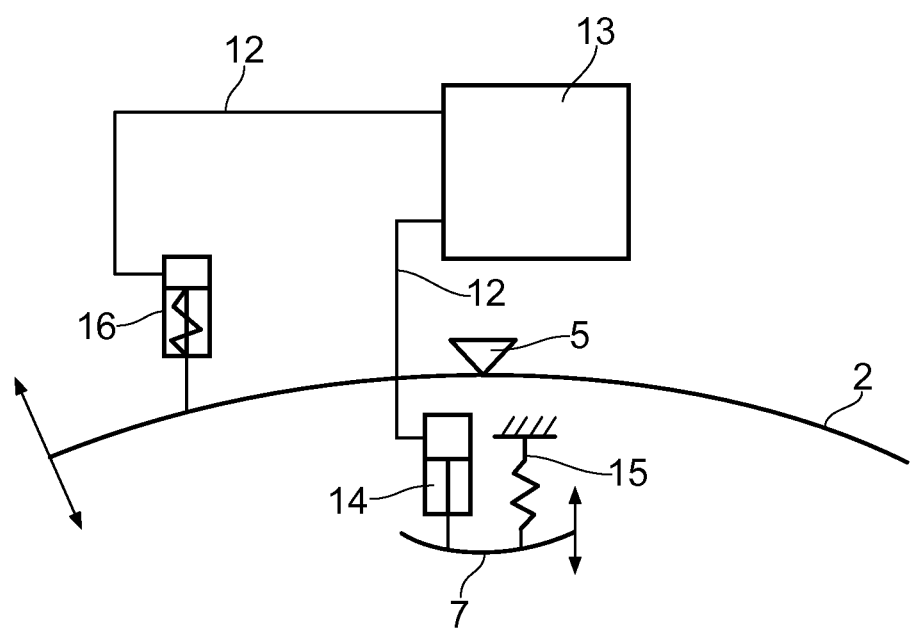
FIG. 9 is a plan schematic view of a pedal and pneumatic connections in accordance with a fifth embodiment of the invention.

FIG. 9 illustrates the control surface 2 and clutch pedal 7 according to a fifth embodiment. Both control surfaces 2, 7 are connected to a pneumatic system 13. The second control surface 7 is connected to the pneumatic system 13 by a pneumatic cylinder 14 and a flow line 12. A spring 15 provides a biasing means which ensures that the second control surface returns to a non depressed state when a depressive force is removed.

The first control surface 2 is connected to the pneumatic system 13 by a pneumatic spring cylinder 16. This provides a pneumatic cylinder combined with a spring.

Figure 10:
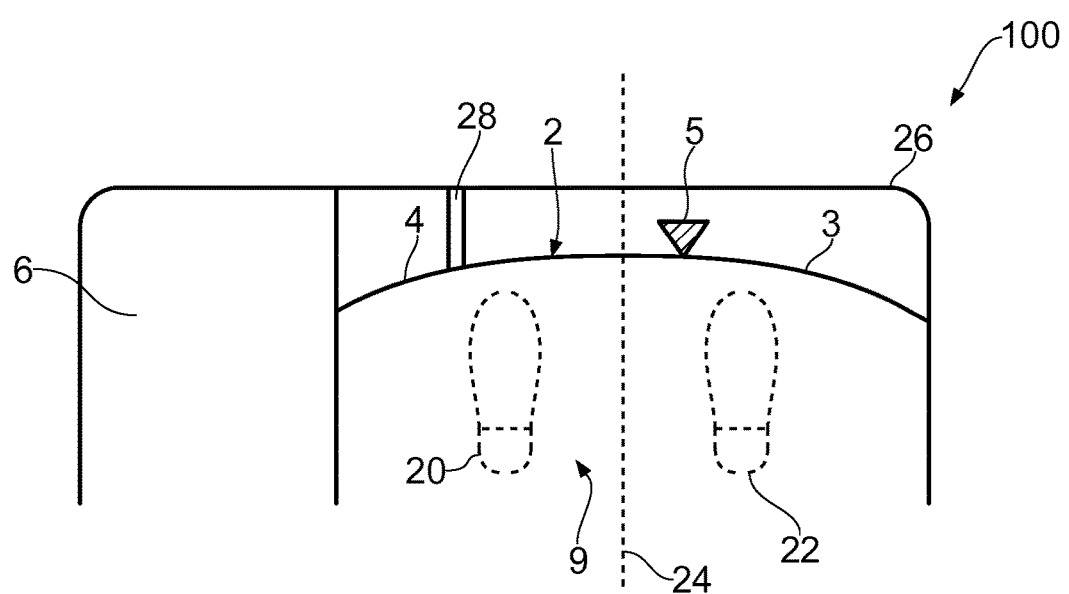
FIG. 10 is a plan schematic view of a pedal in accordance with a sixth embodiment of the invention.

FIG. 10 illustrates a further embodiment of a pedal or control system of the invention. The control system or pedal 100 includes similar elements to that of the embodiment illustrated in FIG. 2 and similar reference numerals are used to refer to the same features. In addition, the control system 100 includes a linear shaft encoder 28 attached to a back wall 26 of the foot well 9. The linear shaft encoder 28 is also attached to the control surface 2. The linear shaft encoder 28 measures a distance between the back of the control surface 2 and the back wall 26 of foot well 9. Therefore, when a user depresses the first side 3 of control surface 2, the distance between the second side 4 of the control surface 2 and the back wall 26 is increased and this is measured by the linear shaft encoder 28. Similarly, when a user depresses the second side 4 of control surface 2, the distance between the back of control surface 2 and the back wall 26 of foot well 9 is decreased which is measured by linear shaft encoder 28.

Figure 11:
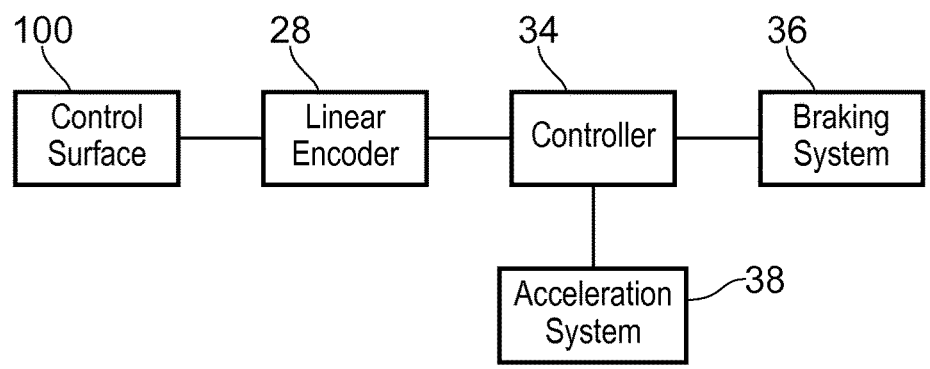
FIG. 11 is a schematic illustration of a control surface according to the embodiment of FIG. 10 arranged in a vehicle.

FIG. 11 is a schematic illustration of an arrangement of the control surface 100 arranged in a vehicle. As illustrated in FIG. 11, control surface 100 is attached to the linear encoder 28 illustrated in FIG. 10. The linear encoder 28 is, in turn, attached to a controller 34. The controller 34 controls acceleration and braking of the vehicle and is therefore attached to a braking system 36 and to an acceleration system 38. It is to be realised that braking system 36 and acceleration system 38 illustrated in FIG. 11 are known in the art and will therefore not be further described herein.

As the control surface 100 pivots about fulcrum 5, the distance between the control surface 2 and the back wall 26 of the foot well 9 varies in the manner described above. This variation in distance is detected by linear encoder 28 and communicated to controller 34. The controller 34, by continuously monitoring the distances reported by linear encoder 28, is able to determine when the direction in which control surface 2 pivots changes. In other words, the controller is able to determine when a user depresses an opposite side of the control surface 2.

The controller 34 is adapted to react to a determination that the direction of pivoting of the control surface 2 has changed by switching between acceleration system 38 and braking system 36. In the embodiment illustrated in FIG. 10, the first side 3 of control surface 2 is connected to acceleration system 38 and second side 4 of control surface 2 is connected to braking system 36.

When a user presses the first side 3 of control surface 2 using foot 22, the controller 34 engages the acceleration system 38. When the user then causes the control surface 2 to start pivoting in the opposite direction by depressing the second side 4 by using foot 20, the controller 34 will detect this change in the pivoting direction and immediately swap from the acceleration system 38 to the braking system 36.

In this way, the controller is able to detect a change in the direction of pivoting of the control surface 2 and translate this immediately into a change between acceleration and braking. This has the advantage that, in an emergency situation, the system need not rely on the lag which may be produced by having the control surface first return to a neutral position before the braking system is engaged, which occurs with control surfaces known in the art.

Although the above description applies to a change between acceleration and braking, it is to be realised that the same considerations apply between braking and acceleration. Furthermore, the above embodiment has been described with a user using separate feet to operate the two sides of control surface 2, but it is to be realised that the user could use one foot by moving that foot between the two sides 3 and 4 of the control surface 2.

A rotary shaft encoder may be used in place of the linear shaft encoder 28 to measure angular displacement of the control surface 2. Other systems and sensors for measuring distance or the pivotal extent of the control surface 2 may also be used.

Figure 12:
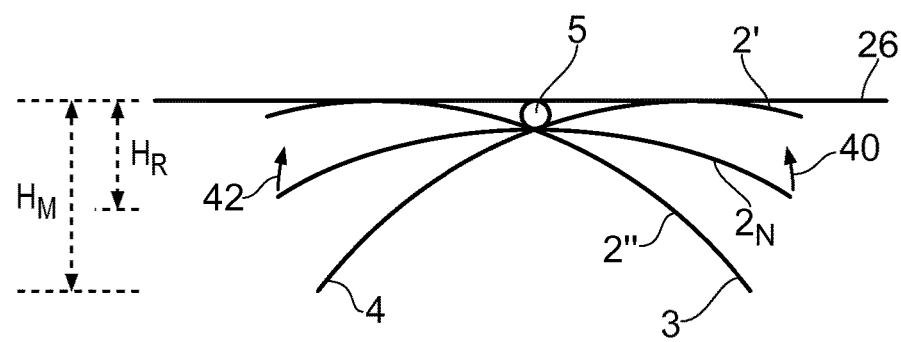
FIG. 12 is a schematic illustration of a plan view of a control surface according to an embodiment of the invention illustrating an operation of the control surface.

FIG. 12 is a schematic illustration of a plan view of a control surface 2 and fulcrum 5 according to an embodiment of the invention illustrating an operation of the control surface. In FIG. 12 the control surface 2 is shown in a neutral position $2_N$ which is the position which the control surface occupies when the vehicle is at rest. Arrow 40 represents the direction in which the control surface is moved to produce acceleration. Similarly, arrow 42 represents the direction in which the control surface 2 moves to produce braking.

The position illustrated at 2' in FIG. 12 is the position of maximum extension for acceleration. In other words, when the control surface 2 reaches the position 2', where side 3 of the control surface abuts the back wall 26 of the foot well 9, it is not possible for the control surface 2 to extend any further in this direction and therefore this position corresponds to the maximum acceleration of the vehicle. Similarly, the position 2" represents the position corresponding to maximum braking of the vehicle where side 4 abuts back wall 26 of foot well 9.

As illustrated in FIG. 12, when the control surface is at position $2_N$, the maximum linear distance either side of the control surface is able to be displaced is the distance $H_R$, shown by the marked dotted line in FIG. 12. However, when the control surface is in either of position 2' or 2" the maximum linear distance the corresponding side may be displaced through is $H_M$ (also shown in dotted line in FIG. 12).

Therefore, the controller 34 (as shown in FIG. 11) is able to, using the linear or radial measurement of the position of the control surface 2 (FIGS. 9 and 10), use the entire available extent of movement of the control surface from the position where it is first depressed as the full distance for the entire range of braking or acceleration of the vehicle. In a further embodiment, the control surface may be used in conjunction with the electromechanical interface described in co-pending application no. GB1004680.3 issued to the same applicant.

By way of illustration, if it is assumed that the control surface is in position 2″ shown in FIG. 12 due to the vehicle having undergone braking. The user will then issue an acceleration instruction by depressing side 3 of the control surface. The controller 34 will have determined that the entire distance $H_M$ is available and therefore have mapped the range of movement through this distance onto a degree of acceleration so that the entire dynamic range of available acceleration is represented by the positions of the control surface between the positions 2″ and 2′. Similarly, if the side 3 is depressed when the control surface is in position $2_N$, the controller 34 will map the available linear distance $H_R$ onto the full dynamic range of acceleration instructions.

It is to be realised that this will apply not only to the extreme positions illustrated in FIG. 12, but that the controller is able to convert all available positions into the full dynamic range available for acceleration, or braking, as the case may be. Therefore, any change from acceleration to braking, or vice versa, will be interpreted by the controller 34 appropriately.

In a further embodiment, the pneumatic system comprises separate pneumatic systems for each of the acceleration and braking of the vehicle.

In further embodiments damping may also be provided for both control surfaces 2, 7. Damping may be adjusted to provide the driver of the vehicle with an appropriate and optimal haptic response. Damping may be implemented using separate damping elements connected to the control surfaces 2, 7 or within the pneumatic system 13.

The invention claimed is:

1. A control system for a vehicle, the vehicle comprising an acceleration system, a braking system and a foot well, the control system comprising:
    a pedal comprising a control surface mounted in the foot well of the vehicle for pivoting movement about a fulcrum provided in the foot well of the vehicle, the control surface having:
        an upper end;
        a lower end; and
        an axis about which the control surface pivots through an angular range, the axis running from the lower end toward the upper end of the control surface;
    said control surface being connected to said acceleration system and said braking system so that pivoting of an entirety of said control surface in a first direction causes braking of said vehicle and pivoting of the entirety of the control surface in a second direction causes acceleration; and
    a controller configured to detect a change in the direction of pivoting of said control surface and translate the change immediately into a change between acceleration and braking when the control surface is at any point in the angular range, such that the control surface need not return to a neutral position before changing between acceleration and braking, the controller being arranged to determine an available range of movement for the braking or acceleration upon detection of a change of pivoting of the control surface from the first direction to the second direction and vice versa, and to map the full dynamic range of braking or acceleration instructions onto the available range of movement for braking or acceleration.

2. The control system according to claim 1, wherein said controller for determining any change in the direction of pivoting of said control surface comprises a means for detecting a distance between said control surface and the foot well of said vehicle.

3. The control system of claim 1, wherein the range of movement of the control surface in the first direction to cause braking is dependent upon the position of the control surface about the fulcrum.

4. The control system of claim 1, wherein the range of movement of the control surface in the second direction to cause acceleration is dependent upon the position of the control surface about the fulcrum.

5. The control system according to claim 1, further comprising a clutch pedal, wherein the clutch pedal is located in between the control surface and a driver's position of the vehicle, extends from the floor of the foot well, and is located substantially in lateral alignment with the fulcrum.

6. The control system of claim 5, wherein the clutch pedal is located between the fulcrum and a location of a user.

7. The control system of claim 1, wherein said control surface is concave with respect to a user.

8. The control system of claim 1, wherein said control surface is orientated substantially vertically with respect to an orientation of a user.

9. The control system according to claim 1, further comprising a first side and a second side, each of the first and second sides of the control surface extending from the lower end to the upper end and wherein the fulcrum is offset from the center of the control surface toward the second side of the control surface such that an area provided at the first side for initiating braking of the vehicle is greater than an area of the control surface provided at the second side for initiating acceleration of the vehicle.

* * * * *